(12) United States Patent
Bhrugumalla

(10) Patent No.: US 8,897,602 B2
(45) Date of Patent: Nov. 25, 2014

(54) IMAGING SYSTEM WITH MULTIFRAME SCALER

(75) Inventor: Satish Kumar Bhrugumalla, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 703 days.

(21) Appl. No.: 12/784,357

(22) Filed: May 20, 2010

(65) Prior Publication Data

US 2011/0019936 A1 Jan. 27, 2011

Related U.S. Application Data

(60) Provisional application No. 61/227,760, filed on Jul. 22, 2009.

(51) Int. Cl.
*G06K 9/32* (2006.01)
*G06T 3/40* (2006.01)
*H04N 101/00* (2006.01)
*H04N 5/232* (2006.01)

(52) U.S. Cl.
CPC .............. *G06T 3/40* (2013.01); *H04N 2101/00* (2013.01); *H04N 5/23267* (2013.01); *H04N 5/23293* (2013.01); *H04N 5/23219* (2013.01); *H04N 5/23235* (2013.01); *H04N 5/232* (2013.01)
USPC ............................ 382/298; 382/299; 382/300

(58) Field of Classification Search
CPC ........ G06T 3/40; G06T 1/20; G06K 9/00228; G06K 9/00221
USPC .................................. 382/298–300
See application file for complete search history.

(56) References Cited

U.S. PATENT DOCUMENTS

| | | | | |
|---|---|---|---|---|
| 6,173,068 B1* | 1/2001 | Prokoski | ........................ | 382/115 |
| 7,453,506 B2* | 11/2008 | Li | ............................ | 348/333.12 |
| 7,502,063 B2* | 3/2009 | Baer | ........................ | 348/333.01 |
| 7,570,296 B2* | 8/2009 | Sawachi | ................... | 348/333.11 |
| 7,587,524 B2 | 9/2009 | Cho et al. | | |
| 7,589,748 B2 | 9/2009 | Ahn | | |
| 7,705,884 B2* | 4/2010 | Pinto et al. | ............... | 348/208.99 |
| 7,804,529 B2* | 9/2010 | Kijima | ..................... | 348/231.99 |
| 7,848,582 B2* | 12/2010 | Ozaki | ........................... | 382/233 |
| 7,949,189 B2* | 5/2011 | Nara | ............................. | 382/189 |
| 2003/0218682 A1* | 11/2003 | Lim et al. | ................. | 348/333.11 |
| 2004/0204144 A1* | 10/2004 | Lim | .............................. | 455/566 |
| 2004/0207743 A1* | 10/2004 | Nozaki et al. | ............ | 348/333.12 |
| 2005/0152197 A1* | 7/2005 | Cho et al. | ....................... | 365/221 |
| 2005/0190270 A1* | 9/2005 | Park | ............................ | 348/222.1 |

(Continued)

*Primary Examiner* — Utpal Shah
(74) *Attorney, Agent, or Firm* — Treyz Law Group; G. Victor Treyz

(57) ABSTRACT

An electronic device may have a camera module and a host subsystem. The camera module may include a camera sensor and associated image processing and data formatting circuitry. The image processing and data formatting circuitry may include an image processor that produces unscaled images frames using data from the camera sensor. Unscaled image frames may be processed in multiple paths between the image processor and the host subsystem such as a path that includes an image compression circuit block, a parallel path that includes a preview scaler, and a parallel path that includes a multiframe scaler and a frame buffer and multiframe image processor circuitry. The multiframe scaler may scale unscaled frames for buffering and processing by the frame buffer and multiframe image processor circuitry to produce analysis results. The analysis results may be appended to compressed unscaled image frames sent to the host subsystem.

14 Claims, 9 Drawing Sheets

(56) References Cited

U.S. PATENT DOCUMENTS

| | | | |
|---|---|---|---|
| 2007/0109292 A1* | 5/2007 | Dahan et al. | 345/211 |
| 2008/0225155 A1* | 9/2008 | Ebato et al. | 348/333.05 |
| 2009/0002398 A1* | 1/2009 | Goerzen | 345/660 |
| 2009/0066815 A1* | 3/2009 | Nozaki et al. | 348/231.99 |
| 2009/0268071 A1 | 10/2009 | Ahn | |
| 2010/0053363 A1 | 3/2010 | Kim | |
| 2010/0079621 A1 | 4/2010 | Jang | |
| 2012/0092522 A1* | 4/2012 | Zhang et al. | 348/223.1 |

* cited by examiner

IMAGING SYSTEM WITH MULTIFRAME SCALER

This application claims the benefit of provisional patent application No. 61/227,760, filed Jul. 22, 2009, which is hereby incorporated by reference herein in its entirety.

BACKGROUND

The present invention relates to imaging systems and, more particularly, to imaging systems with frame buffers and multiframe image processors.

Digital cameras and other electronic devices use digital camera modules to capture video and still digital images. A typical camera module includes a camera sensor and associated image processing and data formatting circuitry. The image processing and data formatting circuitry can be implemented using multiple integrated circuits or using a single "system on chip" (SOC) integrated circuit.

It is often desirable to implement image quality enhancement functions using the image processing circuitry. Many such functions require the processing of multiple image frames. For example, video image stabilization functions require that the image processing circuitry compare a frame to a previous frame. Image quality improvement functions for still images may also require that multiple frames be processed. For example, an exposure bracketing function may require that several frames be evaluated to determine which frame has the best exposure.

Providing a camera module with the memory and other resources needed to buffer and process multiple frames tends to increase costs, particularly in devices with megapixel-class image sensors.

DETAILED DESCRIPTION

Figure 1:
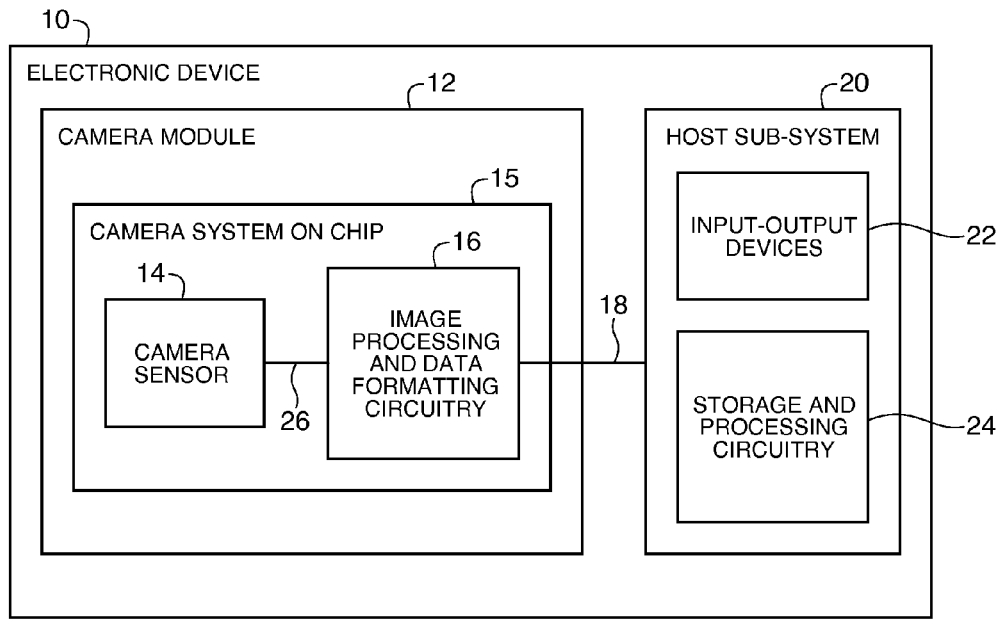
FIG. 1 is a diagram of an electronic device that may include a camera module and host subsystem in accordance with an embodiment of the present invention.

Digital camera modules are widely used in electronic devices. An electronic device with a digital camera module is shown in FIG. 1. Electronic device 10 may be a digital camera, a computer, a cellular telephone, or other electronic device. Camera module 12 may include an image sensor 14 and a lens. During operation, the lens focuses light onto image sensor 14. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit 15. The use of a single integrated circuit to implement camera sensor 14 and image processing and data formatting circuitry 16 can help to minimize costs. If desired, however, multiple integrated circuits may be used to implement circuitry 15.

Circuitry 15 conveys acquired image data to host subsystem 20 over path 18. Electronic device 10 typically provides a user with numerous high level functions. In a computer or advanced cellular telephone, for example, a user may be provided with the ability to run user applications. To implement these functions, electronic device 10 may have input-output devices 22 such as keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
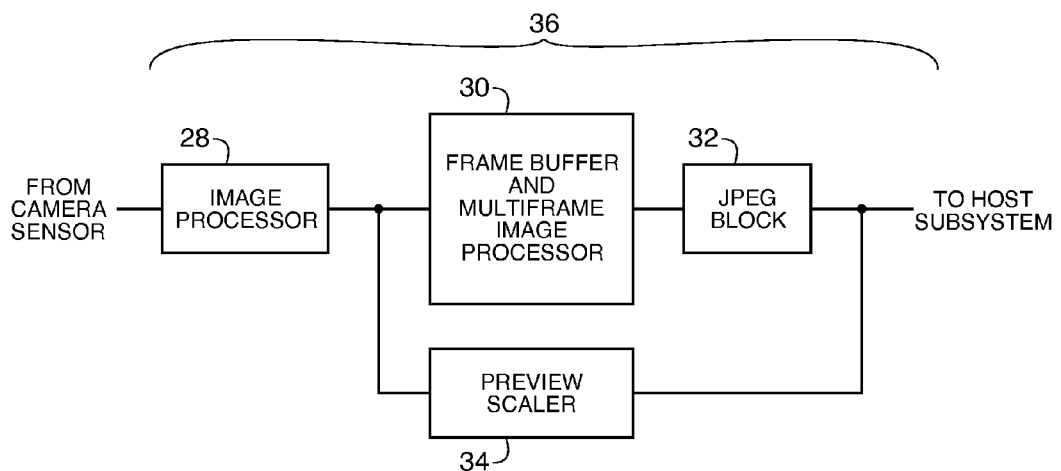
FIG. 2 is a diagram of conventional image processing and data formatting circuitry.

Conventional image processing and data formatting circuitry 36 for a camera module is shown in FIG. 2. As shown in FIG. 2, circuitry 36 includes image processor 28. Image processor 28 may perform operations such as pixel processing operations and color processing operations. Pixel processing may include, for example, correction of dead pixels and de-noising operations. Color processing may include white balance adjustments, exposure adjustments, and color matrix processing to convert images to a desired color space (e.g., YUV). Image frames are produced at the output of image processor 28.

After image processing, image data from the camera sensor may be processed using a capture path or a preview path. As shown in FIG. 2, the capture path for circuit 36 includes frame buffer and multiframe image processor 30 and JPEG block 32, whereas the preview path include preview scaler circuit 34.

The circuitry of frame buffer and multiframe image processor 30 may be used to implement functions such as video stabilization and functions in which multiple images are evaluated to obtain an optimal image. Multiple images may be taken, for example, at different exposures (exposure bracketing) and then evaluated to determine which image should be retained and sent to the host. Functions such as these that require the processing of multiple image frames involve the use of a frame buffer.

The frame buffer in circuit 30 includes sufficient memory to store a desired number of image frames. For example, in cameras that require three frames of about three megapixels each, the frame buffer would be about eight or nine megapixels. In cameras that process eight frames of eight megapixels each, the frame buffer would be 64 megapixels in size. These frame buffer sizes are considerable and add to the size of circuit 36 and therefore its cost and complexity.

JPEG block 32 handles image compression tasks (e.g., when it is desired to convert image data to a *.jpg file format).

When a user is composing a picture, the user often desires to view the picture in real time on the display of the electronic device. Preview operations typically involve the display of images at significantly lower resolution than the maximum resolution available from the camera sensor. For example, a typical camera might have a camera sensor with a resolution of 2272×1704 pixels (4 megapixels), but might have a display with a resolution of only 320×240 pixels. In this type of arrangement, preview scaler 34 is used to reduce the size of the camera sensor data from 2272×1704 (unscaled) to 320× 240 (scaled). The lower-resolution scaled image may then be provided to the host subsystem to display to the user in real time.

Figure 3:
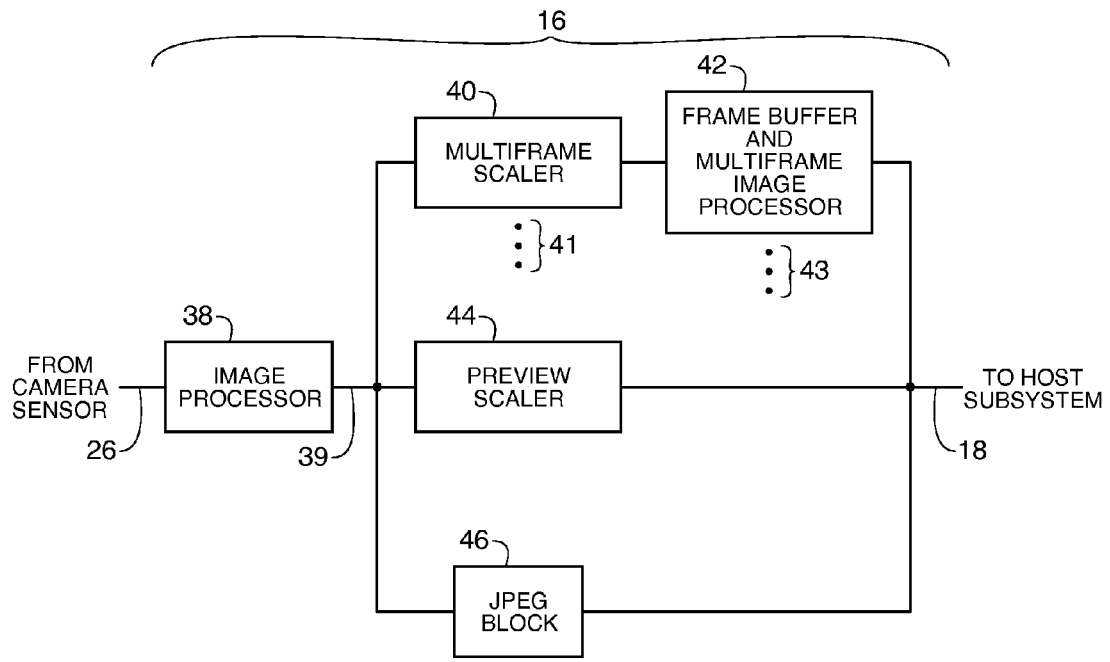
FIG. 3 is a diagram of image processing and data formatting circuitry in accordance with an embodiment of the present invention.

Image processing and data formatting circuitry 16 that may be used in device 10 is shown in FIG. 3. As shown in FIG. 3, image processor 38 may receive video and still image data from camera sensor 14 via path 26. Image processor 38 may perform pixel processing operations such as operations involved in the correction of dead pixels and de-noising operations. Image processor 38 may also perform color processing operations such as while balance adjustments, exposure adjustments, and color matrix processing to convert images to a desired color space.

Image processor 38 supplies image frames at its output. In particular, frames of video and still image data that have been processed by image processor 28 may be supplied using output 39. Data on output 39 may be processed in capture path, a preview path, or a scaled multiframe processing path. As shown in FIG. 3, the capture path for circuit 36 includes JPEG block 46 (i.e., an image compression circuit block). When activated, JPEG block 46 may compress data from output 39 and may provide corresponding compressed versions of the image frame data to host subsystem 20 (FIG. 1) via path 18 (e.g., in the form of a JPEG file). The preview path for circuitry 16 may include preview scaler 44. As with conventional preview scaler 34 of FIG. 2, preview scaler 44 of FIG. 3 may scale the size of incoming images. As an example, preview scaler 44 may to reduce incoming frames at a 2272× 1704 (4 megapixel unscaled) resolution to a scaled size of 320×240. The scaled output of preview scaler 44 may be provided to host subsystem 20 via path 18 to display in real time (e.g., on a liquid crystal display on device 10).

Circuitry 16 also can process output from image processor 38 in a multiframe processing path using multiframe scaler circuit 40 and frame buffer and multiframe image processor circuit 42. Scaler 40 reduces the size of the frames on output 39. For example, scaler 40 may to reduce incoming frames of 2272×1704 (4 megapixel unscaled) resolution to a scaled size of 320×240 or to a scaled size of 800×480. Other scaled sizes may also be produced at the output of scaler 40. These are merely illustrative examples. In general, the size of the scaled output of scaler 40 is chosen to ensure that sufficient resolution remains in the scaled images to perform desired processing operations. For example, if it is desired to implement face recognition operations, the scaled frames at the output of scaler 40 preferably have sufficient resolution to resolve faces accurately.

Frame buffer and multiframe image processor 42 includes frame buffer circuitry that is sufficiently large to hold multiple scaled frames (e.g., about 2 to 10 frames or other numbers of frames). Because the frames in the frame buffer of circuit 42 have been scaled by scaler 40, the amount of memory and other circuit resources that are needed to implement the frame buffer can be relatively small. This helps to reduce the size and cost of circuit 16 and therefore circuitry 15 (FIG. 1).

The circuitry of frame buffer and multiframe image processor 42 may be used to implement functions in which multiple frames are processed. For example, circuitry 42 may perform functions such as video stabilization and functions in which multiple images are evaluated to obtain an optimal image. In video stabilization applications, a frame may be compared to a previous frame to determine the location of a stabilized region in the frame. In multiframe image quality enhancement processing, multiple frames are acquired by camera sensor 14 (e.g., in response to a single shutter press by a user). These multiple frames are then analyzed for quality.

For example, multiple frames may be taken at different exposure times to implement an automatic bracketing function. Using circuitry 42, the frames may be evaluated. Each frame in a group of frames may, as an example, be assigned a respective quality factor. As an example, a frame with a good exposure might receive a quality factor value of 0.7, whereas a frame of the same scene that has been taken with a poor exposure might receive a quality factor value of 0.4. The results of the multiframe processing that is performed on the scaled frames may be provided from circuitry 42 to host subsystem 20 over path 18. The original frames (in their full resolution and optionally compressed by JPEG block 46) may also be provided to the host. With one arrangement, the processing results (e.g., quality factor values or other results information) may be appended to each original frame. The host may evaluate the quality factor of each frame and can take appropriate actions. For example, the host can retain only the best frame (i.e., the frame with the highest quality factor) while discarding all other frames from the same group.

Any number of frames may be processed by circuitry 42. In a typical video stabilization operation, at least two frames are processed. In other functions such as exposure bracketing, face recognition, smile recognition, blur detection, etc., 2-10 frames or more may be processed. The size of the frame buffer in circuitry 42 is configured to be large enough to handle the maximum desired number of scaled frames from scaler 40. Scaler 40 produces frames that are smaller than those received from image processor 38. Any amount of scaling may be applied (e.g., 2:1 or more, 10:1 or more, 20:1 or more, 100:1 or more, etc.). Scaling may be performed using integer ratios or non-integer ratios.

If desired, circuitry 16 may include multiple pairs of multiframe scaler circuitry 40 and frame buffer and multiframe image processor circuitry 42. As shown in FIG. 3 there may be additional multiframe scalers 41 and additional frame buffer and multiframe image processors 43. With this type of arrangement, each pair of circuits 40 and 42 may perform a different image processing operation. For example, a first pair of circuits 40 and 42 may perform image stabilization operations, a second pair of circuits 40 and 42 may perform image quality analysis operations, and a third pair of circuits 40 and 42 may perform facial recognition operations. These are merely examples and, in general, any number of circuits 40 and 42 may be used to perform any number of image processing operations.

Each multiframe scaler 40 may produce one or more scaled images for one or more circuits 42. As one example, a single multiframe scaler 40 may produce a single scaled image from each unscaled image from processor 38 and may provide that single scaled image to one or more circuits 42. As another example, a single multiframe scaler 40 may produce multiple scaled images, each with a different amount of scaling, and may provide the multiple scaled images to one or more circuits 42 (e.g., each circuit 42 may receive a respective one of the multiple scaled images).

Figure 4A:
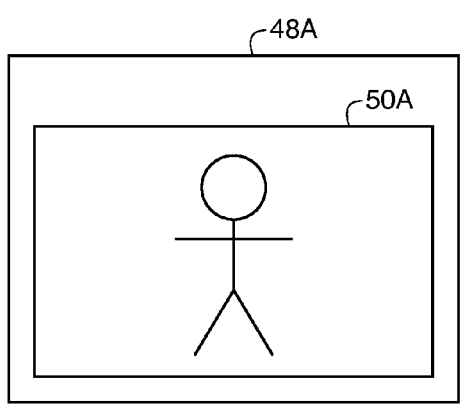
FIGS. 4A and 4B are diagrams showing how image processing circuitry may produce analysis results that identify a stabilized region in frames of video to implement video image stabilization in accordance with an embodiment of the present invention.
Figure 4B:
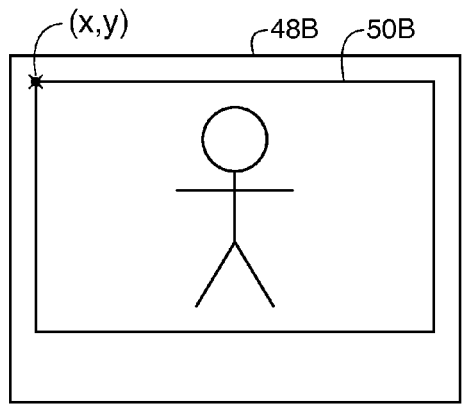

Video stabilization operations that may be performed by circuitry 16 may be understood with reference to FIGS. 4A and 4B. As shown in FIGS. 4A and 4B, camera sensor 14 (FIG. 1) may acquire image frames 48A and 48B. Frames may be acquired at any rate (e.g., 30 fps). In video stabilization mode, the amount of video that is retained is a subset of the overall frame. For example, in FIG. 4A, stabilization region 50A represents a subset of frame 48A. Initially, frame 48A may be acquired. After acquiring frame 48A of FIG. 4A, frame 48B of FIG. 4B may be acquired. In frame 48A, the subject of interest occupies the lower portion of frame 48A. By locking onto this portion of the scene, undesired motion ("camera shake") can be reduced. The desired portion of the frame can be identified using image processor 42. As each new frame is received by image processor 42, image processor 42 compares the new frame to the previous frame. This process may be repeated continuously. In each frame that is processed, the desired portion of the frame that is to be retained is identified. In the example of FIGS. 4A and 4B, the retained portions of the frames are stabilization region 50A and stabilization region 50B. The location of the stabilization regions may be identified using any desired technique. With one arrangement, each stabilization region is identified by the coordinates of its origin. The origin of region 50B is shown as (x, y) in FIG. 4B.

Figure 5:
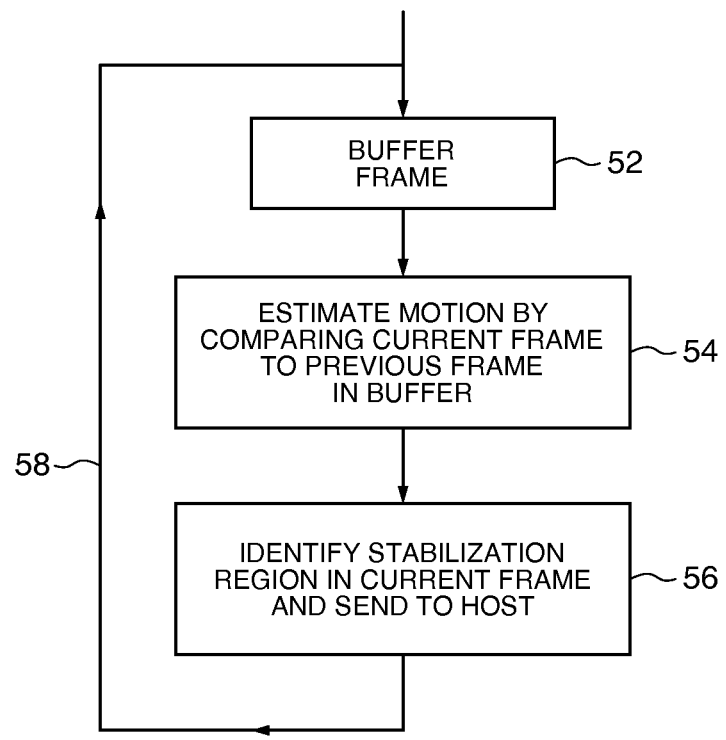
FIG. 5 is a flow chart of conventional steps involved in performing video stabilization using a multiframe buffer and image processing circuitry in a camera module.

Conventional steps involved in video stabilization (e.g., using conventional circuitry 36 of FIG. 2) are shown in FIG. 5. At step 52, a new frame is buffered in frame buffer and multiframe image processor circuit 30 (FIG. 2). At step 54, the new frame in the buffer is compared to the previous frame in the buffer to detect motion. Circuitry 30 then identifies the stabilization region (step 56) and sends the stabilization region to the host. The host may then retain the stabilization region data in a video file. As indicated by line 58, the operations of FIG. 5 may be repeated continuously while a user is acquiring video.

Figure 6:
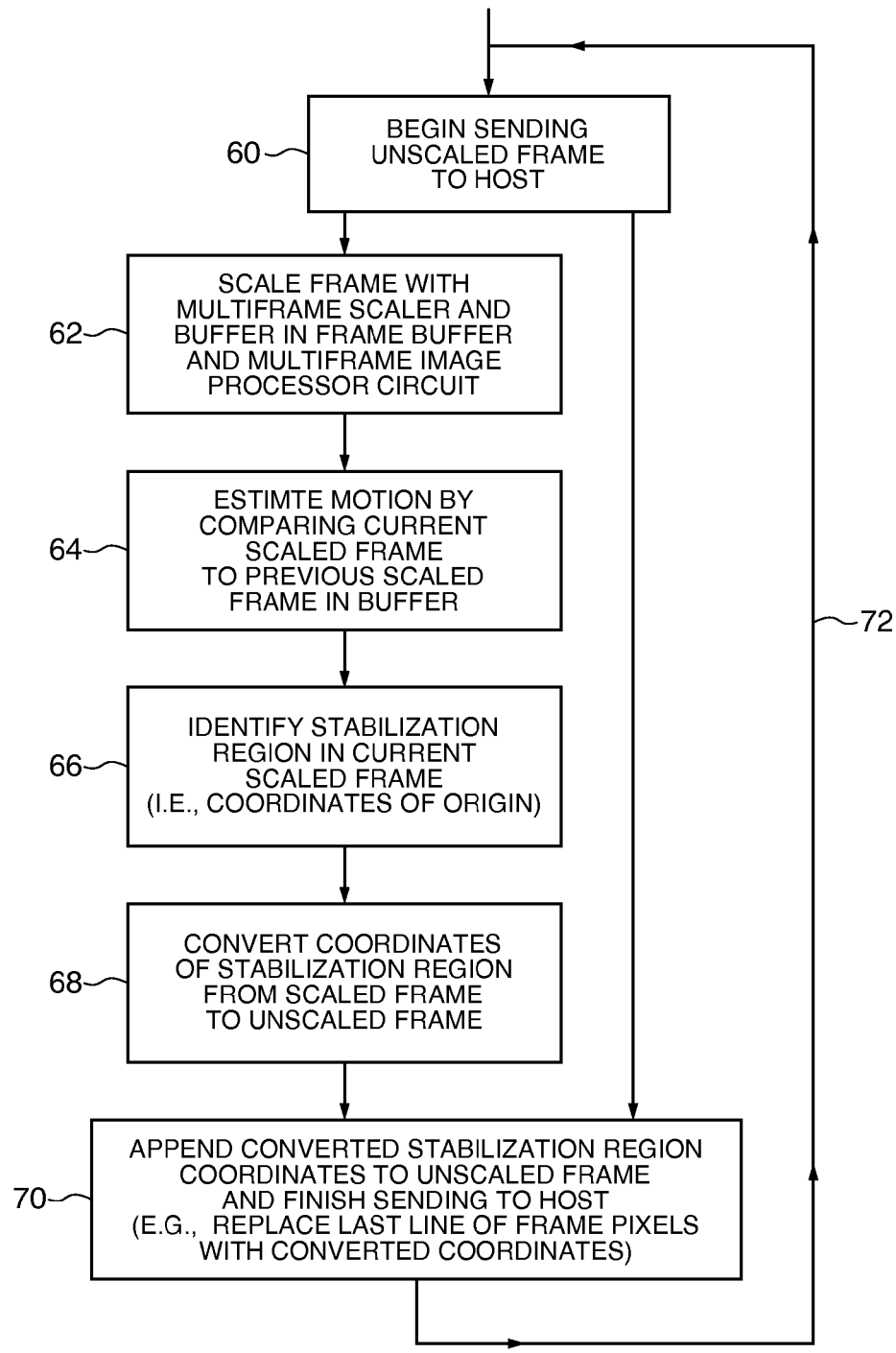
FIG. 6 is a flow chart of steps involved in performing video stabilization using a multiframe buffer and image processing circuitry in a camera module in accordance with an embodiment of the present invention.

Illustrative steps involved with performing video stabilization using circuitry 16 of FIG. 3 in device 10 of FIG. 1 are shown in FIG. 6.

At step 60, circuitry 16 begins sending the current frame from image processor 39 to host 20. The image compression functions of JPEG circuit block 46 may be switched on or off in response to user input to host 20. If JPEG block 46 is active, image frames are sent as JPEG data. If JPEG block 46 is inactive, frames may be sent in uncompressed form. Any form of compression and data file storage may be used if desired (e.g., TIFF, video-specific compression formats, etc.). The use of JPEG compression is merely illustrative.

After initiating the process of sending the current unscaled frame from image processor 38 (FIG. 3) to host subsystem 20 (FIG. 1) at step 60, processing can continue at step 62. During the operations of step 62, multiframe scaler 40 (FIG. 3) scales the current unscaled frame to generate a corresponding scaled frame. This scaled frame is buffered in the frame buffer of circuitry 42.

At step 64, frame buffer and multiframe image processor 42 (FIG. 3) estimates motion by comparing the current scaled frame to the previous scaled frame in the frame buffer of circuitry 42. Because these buffering and frame processing operations are performed on scaled data from multiframe scaler 40 instead of unscaled images, the complexity requirements for frame buffer and multiframe image processor 42 can be relatively low.

At step 66, the stabilization region (e.g., region 48B of FIG. 4B) may be identified in the current scaled frame. The location of the stabilization region may be identified by its coordinates (e.g., the coordinates x,y in the example of FIG. 4B).

At step 68, circuitry 42 may convert the coordinates of the stabilization region in the scaled frame into the coordinate system for the unscaled frame. This operation maps the reduced-size coordinate system of the scaled image to the full-size coordinate system of the unscaled image, so that the resulting converted coordinates represent the location of the stabilization region within the unscaled frame (i.e., the frame for which transmission operations began at step 60).

At step 70, the converted stabilization region coordinates (or other stabilization region location information) may be appended to the unscaled frame data and the unscaled frame data may be sent to host 20. This stabilization region location information represents a form of analysis results produced by circuitry 42. Any desired technique may be used to combine the stabilization region coordinates with the unscaled frame. With one illustrative arrangement, the coordinates may be included in the last line of pixels in the unscaled frame (i.e., in place of the original pixels in the frame). Host 20 may receive the unscaled frame and the embedded stabilization region coordinates or other analysis results and may process the received video frames accordingly (e.g., by discarding the portions of the frame outside of the stabilization regions). As indicated by line 72, the processes of FIG. 6 may be repeated continuously (e.g., until terminated by the user).

If desired, multiple frames (e.g., 2-10 or more) may be buffered and processed in connection with capturing a still image. For example, a user may select a multiframe mode from a set of selectable options on device 10. When this mode is active, each single press of the shutter button will result in the buffering of a group of multiple frames of data from camera sensor 14 (FIG. 1). Camera module 12 and host subsystem 20 can operate together to analyze each frame in the group and take appropriate actions. The processing operations that are performed on the frames may include any desired image processing operations. Examples of multiframe image processing functions include exposure bracketing, face detection, smile detection, motion blur detection, etc.

In a typical scenario, a user presses a shutter and multiple frames are acquired. Each frame is scaled using scaler 40 and is buffered in circuitry 42. The scaled frames are then analyzed and corresponding analysis results are produced. The analysis results may be presented in the relatively simple form of a quality factor (e.g., a single number ranging from 0 to 1.0 or other range) or as relatively more complex results data (e.g., data involving multiple parameters). Based on the results of the frame analysis, host 20 (FIG. 1) may take appropriate actions. For example, host 20 may receive all of the unscaled frames and the associated frame analysis results and may retain only the unscaled frame with the best quality factor. Because this type of arrangement offloads some of the processing tasks that would otherwise be handled by circuitry 16 (FIG. 1) to host 20 (FIG. 1), the resources that are required to implement circuitry 16 may be reduced and costs may be reduced accordingly. Host 20 typically has large amounts of available general purpose memory (e.g., in the form of RAM and flash in storage and processing circuitry 24), so it is not burdensome to host 20 to buffer and process a number of unscaled frames. At the same time, it is helpful to implement image quality evaluation functions on circuitry 16, rather than requiring different hosts to interface with the hardware associated with a potentially large variety of different camera sensors.

Figure 7:
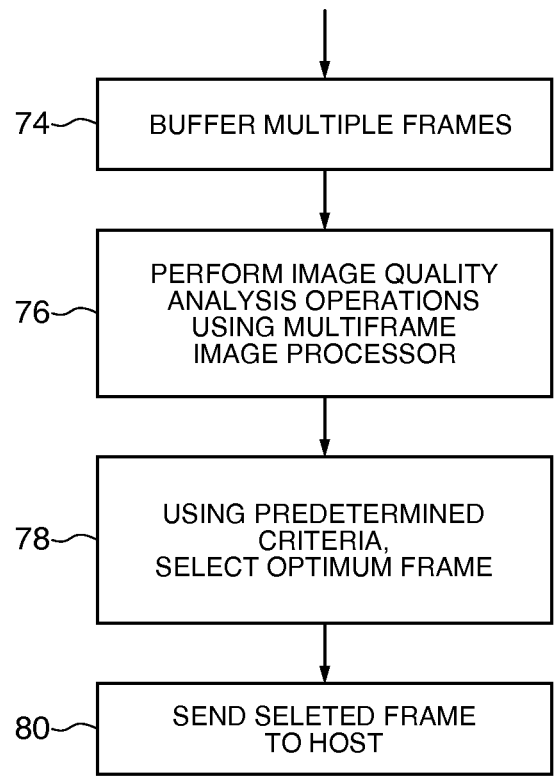
FIG. 7 is a flow chart of conventional steps involved in performing image quality analysis operations using a multiframe buffer and image processing circuitry in a camera module.

Steps involved in performing image quality analysis operations with conventional image processing and data formatting circuitry such as circuitry 36 of FIG. 2 are shown in FIG. 7.

At step 74, in response to user activation of a shutter button, circuitry 30 (FIG. 2) may buffer multiple frames from image processor 28 (e.g., five unscaled frames).

At step 76, image analysis operations may be performed on the buffered images using multiframe image processor circuitry 30 (FIG. 2).

At step 78, circuitry 30 may select the best of the five frames to retain based on predetermined criteria. The remaining frames may be discarded.

At step 80, circuitry 30 may send the selected frame to the host subsystem. Optional JPEG compression may be performed by block 32. The host subsystem may then store the selected frame.

Figure 8:
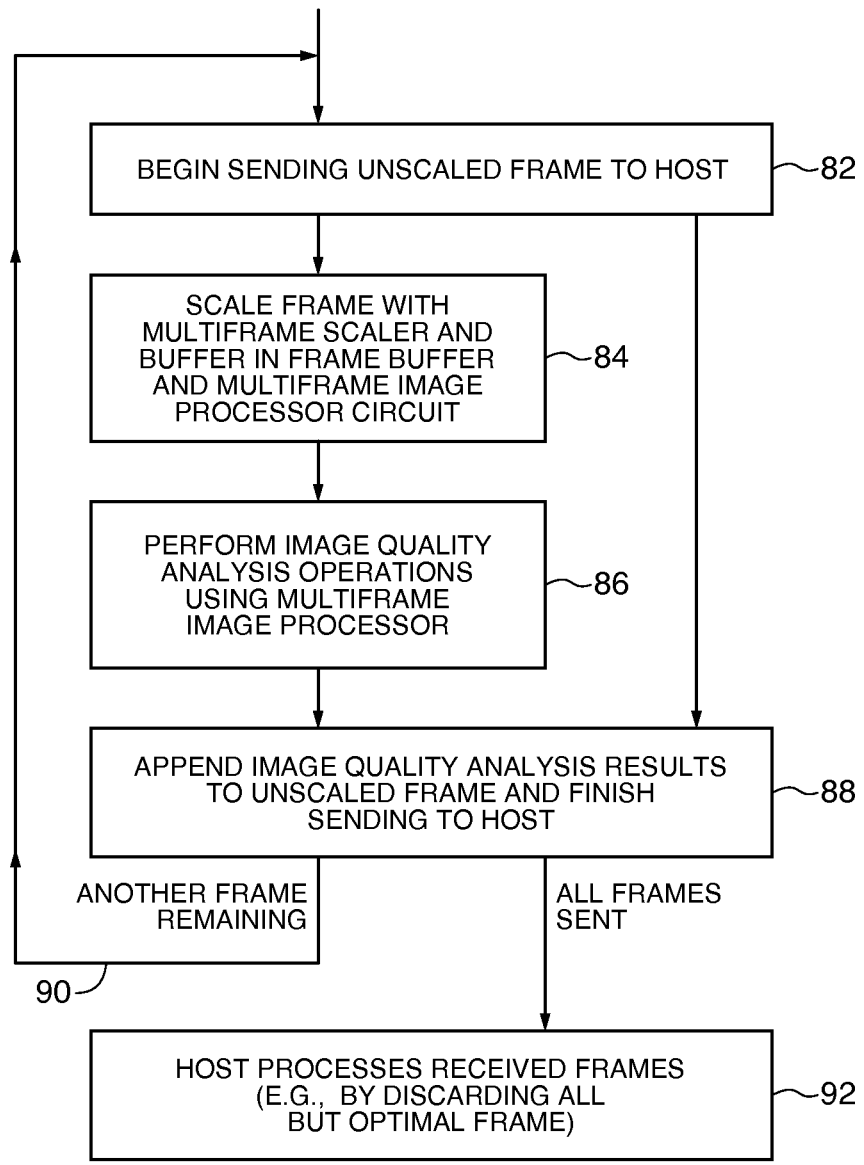
FIG. 8 is a flow chart of steps involved in performing image quality analysis operations using a multiframe buffer and image processing circuitry in a camera module in accordance with an embodiment of the present invention.

Illustrative steps involved in performing image analysis operations using image processing and data formatting circuitry 16 of FIG. 3 are shown in FIG. 8.

At step 82, circuitry 16 may initiate the process of sending an unscaled frame to host subsystem 20 (FIG. 1). If desired, the unscaled frame may be processed by JPEG block 46 (e.g., to compress the unscaled frame by converting the unscaled frame to JPEG format).

At step 84, the unscaled frame that is being sent to the host may be scaled to a smaller size (i.e., smaller number of pixels) using multiframe scaler 40 (FIG. 3) and may be buffered in the frame buffer of circuit 42.

At step 86, circuit 42 may analyze scaled frames in the frame buffer using image processing resources in circuit 42. Any desired image analysis operations may be performed. For example, multiple exposures may be evaluated to determine an optimum exposure, multiple frames of a scene may be analyzed to determine which is the least blurry, frames may be analyzed to determine whether there are any faces or smiles present (indicative of a good picture), etc. The results of the image analysis operations of step 86 may include integer numbers, non-integer numbers, single "quality" values, multiple quality values, alphanumeric quality ratings, or information in any other format that represents the results of the image analysis process. With one arrangement, a quality factor ranging from 0 (low quality) to 1.0 (high quality) is generated for each analyzed frame. This is, however, merely illustrative. Any representation of the image analysis results may be used if desired.

At step 88, the image analysis results from step 86 (e.g., the quality factor) may be appended to the unscaled frame (i.e., the frame that is provided at the output of optional JPEG block 46).

As indicated by line 90, the frame analysis process of FIG. 8 may continue until all frames have been analyzed.

Once all frames have been analyzed, processing may continue at step 92. During the operations of step 92, host subsystem 20 may process the received unscaled frames. Because host subsystem 20 typically includes substantial resources for implementing device-level functions, host subsystem 20 typically has sufficient memory and processing power available to buffer each unscaled frame and to evaluate each of the received frames based on their appended image analysis results information (i.e., quality factor value). For example, the host may discard all of the frames except the frame with the largest quality factor. Retaining only the frame with the best quality factor allows host subsystem 20 to discard blurred frames, frames without detected faces, poorly exposed frames, and other sub-optimal frames, while retaining the best picture for the user.

Excessive shutter lag may be distracting to a user who is trying to capture images with an electronic device. A potential source of shutter lag is the setup time for the capture path in conventional circuits such as circuit 36 of FIG. 2. This effect is illustrated in the diagram of FIG. 9.

Figure 9:
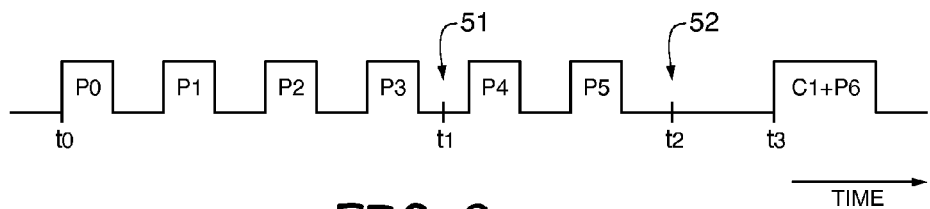
FIG. 9 is a diagram illustrating sources of shutter lag in conventional cameras.

In the example of FIG. 9, a camera is sending preview images (P0, P1, P2, . . . ) to the host from the output of preview scaler 34, starting at time t0. At time t1, a user depresses a shutter button halfway (a so-called "S1" event). When the S1 event is detected in a conventional device, functions such as focusing are performed to attempt to reduce shutter lag. However, there is no alteration in the type of frames being sent to the host. In particular, as shown in FIG. 9, scaled preview frames P4 and P5 are sent to the host following the S1 event. When frames P0 . . . P5 are received by the host, the host can display these preview frames for the user in real time.

When the user decides to take a picture with the camera, the user fully depresses the shutter button. This full button press event is sometimes referred to as an "S2" event. As shown in FIG. 9, once the S2 event is detected, the camera can perform capture path setup operations (from time t2 to t3) and can then send both a preview frame (P6) and a full-resolution (unscaled) capture frame C1 to the host. The capture path setup time (t3-t2) can be non-negligible. In a typical frame capture setup process, the host instructs the camera's image processing and data formatting circuitry (e.g., circuitry 36 of FIG. 2) to capture an image. In response, circuitry 36 finishes any pending frame processing tasks and then reconfigures itself so that the image capture path (e.g., the output of circuit 30 and JPEG block 32) outputs a full (unscaled) image frame to the host. To conserve power, it is generally desirable to maintain circuitry 30 and 32 in a low power state when images are not being actively processed. As a result, there is a finite time (time t3-t2 in the FIG. 9 example) associated with activating the capture path and capturing unscaled frame C1. This time represents a contribution to shutter lag (i.e., the delay between when the user presses the shutter button at time t2 and the time when the image is captured and sent to the host at time t3). Long shutter lags are inconvenient for the user and may cause the user to miss an opportunity to capture a desired fast-moving image.

Figure 10:
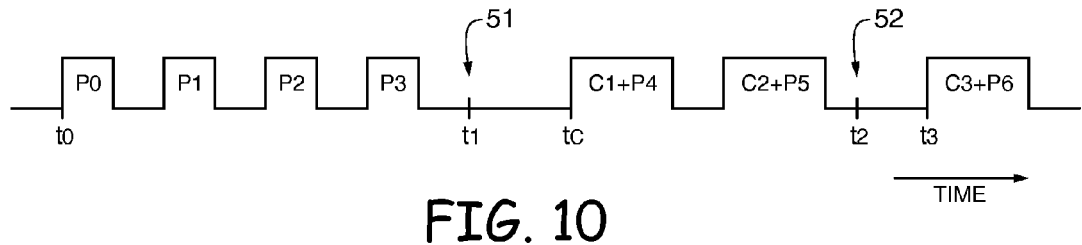
FIG. 10 is a diagram illustrating how shutter lag may be minimized in accordance with an embodiment of the present invention.

As shown in FIG. 10, circuitry 16 may be used to reduce shutter lag. In the FIG. 10 example, preview frames P0 . . . P3 are being sent from preview scaler 44 to host subsystem 20 (FIG. 1) starting at time t0. When the user presses the shutter halfway at time t1, the host detects an S1 event. At this point, the capture path is activated (e.g., by turning on JPEG block 46 and preparing for full-frame capture operations). Once setup operations are completed at time tc, circuitry 16 may send host 20 both preview frames and capture frames (i.e., C1 and P4, C2 and P5). At time t2, a full shutter button press is detected by the host (event S2). Circuitry 16 may then capture a full frame (C3 in the FIG. 10 example) and, at time t3, may send both the captured frame C3 and a corresponding preview frame P6 to the host. Because the capture setup time is incurred following S1 rather than following S2, shutter lag is reduced.

Figure 11:
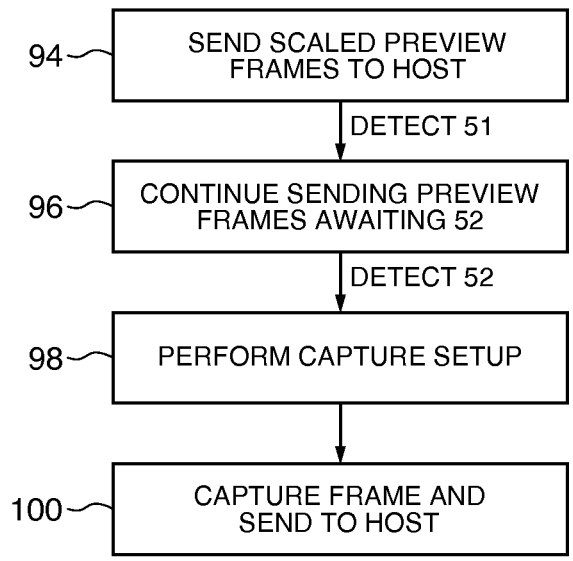
FIG. 11 is a flow chart of conventional steps involved in capturing an image in a conventional camera operated according to the diagram of FIG. 9.

Steps involved in conventional arrangements of the type shown in FIG. 9 are shown in FIG. 11.

At step 94, scaled preview frames are sent to the host (P0 ... P3 of FIG. 9).

At step 96, following detection of an S1 event at time t1, circuitry 36 (FIG. 2) uses preview scaler 34 to continue sending preview frames to the host (i.e., P4 and P5 of FIG. 9). The capture path is not yet set up.

At step 98, after an S2 event is detected at time t2, the capture path is set up, leading to shutter lag.

At step 100 (time t2 of FIG. 9), a captured frame and corresponding preview frame may be sent to the host. The captured frame is unscaled and represents the final image that has been acquired by the camera. The preview image may be displayed on the display of the camera as a preview for the user.

Figure 12:
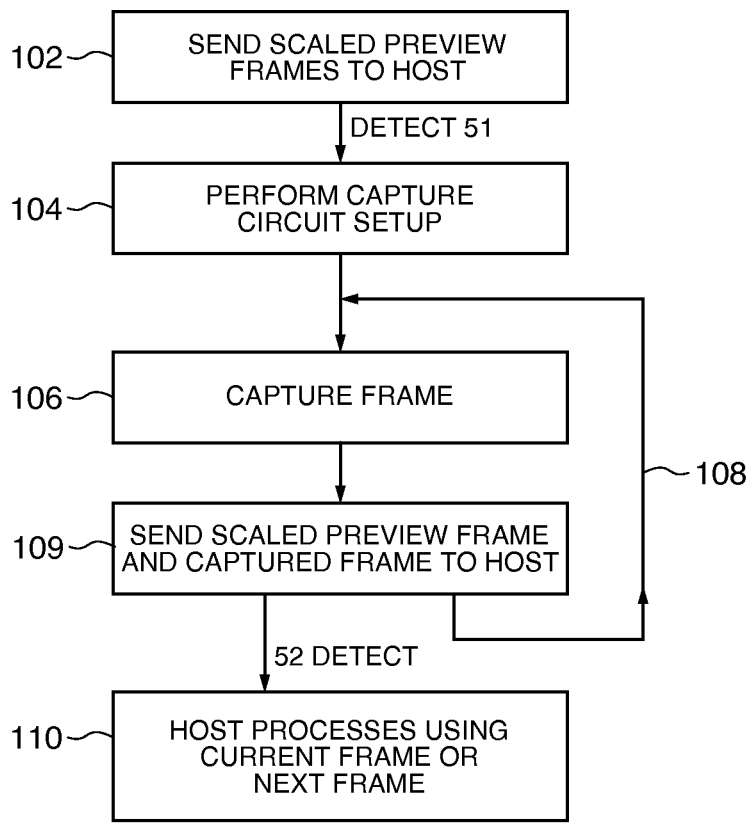
FIG. 12 is a flow chart of steps involved in capturing an image in an electronic device operated according to the diagram of FIG. 10 in accordance with an embodiment of the present invention.

Illustrative steps involved in using circuitry 16 of FIG. 3 to reduce shutter lag in an electronic device such as device 10 of FIG. 1 are shown in FIG. 12.

At step 102, scaled preview frames are sent to the host (P0 ... P3 of FIG. 10).

At step 104, following detection of an S1 event at time t1, circuitry 16 (FIG. 3) activates its capture path functions (e.g., capture path circuitry such as JPEG block 46 of FIG. 3 is turned on and made ready for capturing unscaled frames).

At step 106, an unscaled frame is captured (e.g., starting at time tc of FIG. 10, unscaled frames C1 and C2 are captured).

The unscaled frame that is captured at step 106 is sent with its associated preview frame to host subsystem 20 (FIG. 1) at step 109. Initially unscaled frame C1 from JPEG block 46 and corresponding preview frame P4 from preview scaler 44 of FIG. 3 are sent. As shown by line 108 and the diagram of FIG. 10, this process continues until the S2 event is detected at time t2.

At step 110, following the detection of the S2 event, the host retains the current frame (or optionally the next unscaled captured frame) as the final image. If desired, unscaled frames that are sent from circuitry 16 to the host may be accompanied by appended image analysis results (e.g., video stabilization region location information, quality factor information, etc.). The host may select a desired frame to retain for the user based on the image analysis results or may take other actions.

Various embodiments have been described illustrating an electronic device with image processing and data formatting circuitry having a multiframe scaler. The multiframe scaler may scale frames received from a camera sensor and image processor circuit. A frame buffer and multiframe image processor may buffer and analyze scaled frames.

Video stabilization operations may be implemented using the image processing and data formatting circuitry. Video stabilization region location information may be produced by the frame buffer and multiframe image processor circuitry and may be appended to frames being sent to a host subsystem.

Still image analysis operations may also be implemented using the image processing and data formatting circuitry. For example, each scaled frame may be analyzed to produce a respective quality factor. Quality factors may be appended to unscaled frames and sent to the host for subsequent processing.

Shutter lag may be reduced by performing capture path setup operations following a partial shutter press. After the shutter is partly depressed, both preview frames and capture frames are sent from the image processing and data formatting circuitry to the host. When the shutter is fully pressed, capture path setup operations will already have been completed, so shutter lag is reduced.

Figure 13:
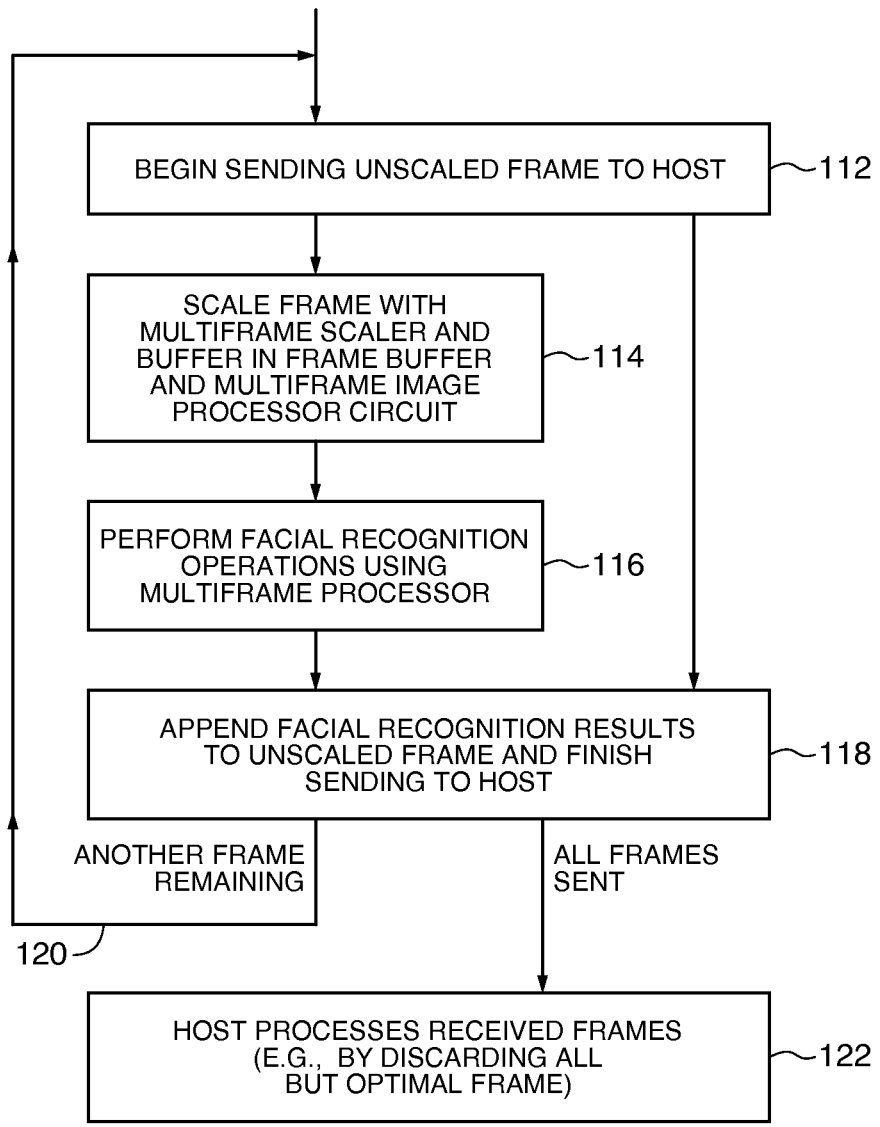
FIG. 13 is a flow chart of steps involved in performing facial recognition operations using a multiframe buffer and image processing circuitry in a camera module in accordance with an embodiment of the present invention.

Illustrative steps involved in performing facial recognition operations using image processing and data formatting circuitry 16 of FIG. 3 are shown in FIG. 13.

At step 112, circuitry 16 may initiate the process of sending an unscaled frame to host subsystem 20 (FIG. 1). If desired, the unscaled frame may be processed by JPEG block 46 (e.g., to compress the unscaled frame by converting the unscaled frame to JPEG format).

At step 114, the unscaled frame that is being sent to the host may be scaled to a smaller size (i.e., smaller number of pixels) using multiframe scaler 40 (FIG. 3) and may be buffered in the frame buffer of circuit 42.

At step 116, circuit 42 may analyze scaled frames in the frame buffer using image processing resources in circuit 42. Any desired image analysis operations may be performed. For example, scaled frames may be evaluated for the presence of users' faces and, when users' faces are present, to identify the users' faces in the scaled frames. If desired, circuit 42 may analyze multiple scaled frames each of which is associated with a different unscaled frame and/or may analyze multiple scaled frames that are associated with a single unscaled frame. The results of the facial recognition operations of step 86 may include flags that indicate the presence of one or more faces, flags that indicate the presence of one or more recognized faces, flags that indicate the presence of one or more unrecognized faces, information identifying the location of faces within the unscaled frame, information identifying the recognized faces (e.g., user identification information such as a username). These examples are, however, merely illustrative. Any representation of the facial recognition results may be used if desired.

At step 118, the facial recognition results from step 116 (e.g., the identity and location of faces) may be appended to the unscaled frame (i.e., the frame that is provided at the output of optional JPEG block 46).

As indicated by line 120, the frame analysis process of FIG. 8 may continue until all frames have been analyzed.

Once all frames have been analyzed, processing may continue at step 122. During the operations of step 122, host subsystem 20 may process the received unscaled frames. Because host subsystem 20 typically includes substantial resources for implementing device-level functions, host subsystem 20 typically has sufficient memory and processing power available to buffer each unscaled frame and to evaluate each of the received frames based on their appended facial recognition results information (e.g., information indicating that faces are present, information identifying the location or faces, and/or information identifying the users whose faces are present).

The foregoing is merely illustrative of the principles of this invention which can be practiced in other embodiments.

What is claimed is:

1. A method for capturing images in an electronic device that has a host subsystem, comprising:
   receiving unscaled image frames that are at a first resolution using image processing and data formatting circuitry that includes a multiframe scaler and that includes frame buffer and multiframe image processor circuitry;
   scaling the unscaled image frames with the multiframe scaler to produce scaled image frames at a second resolution that is less than the first resolution;
   buffering the scaled image frames with the frame buffer and multiframe image processor circuitry;
   analyzing the scaled image frames with the frame buffer and multiframe image processor circuitry to produce analysis results;
   sending the analysis results to the host subsystem;
   sending the unscaled image frames to the host; and
   appending the analysis results to the unscaled image frames that are sent to the host.

2. The method defined in claim 1 wherein appending the analysis results comprises appending a quality factor to the unscaled image frames.

3. The method defined in claim 1 wherein appending the analysis results comprises appending video stabilization region information to the unscaled frames.

4. The method defined in claim 1 further comprising:
   scaling the unscaled image frames with a preview scaler to produce scaled preview frames at a third resolution that is less than the first resolution.

5. The method defined in claim 4 further comprising sending the scaled preview frames to the host.

6. The method defined in claim 5 wherein sending the scaled preview frames to the host comprises sending each unscaled frame with a corresponding scaled preview frame to the host.

7. The method defined in claim 6 further comprising:
   compressing the unscaled image frames with an image compression circuit before sending the unscaled image frames to the host.

8. A method for capturing images in an electronic device that has a host subsystem, comprising:
   receiving unscaled image frames that are at a first resolution using image processing and data formatting circuitry that includes a multiframe scaler and that includes frame buffer and multiframe image processor circuitry;
   scaling the unscaled image frames with the multiframe scaler to produce scaled image frames at a second resolution that is less than the first resolution;
   buffering the scaled image frames with the frame buffer and multiframe image processor circuitry;
   analyzing the scaled image frames with the frame buffer and multiframe image processor circuitry to produce analysis results;
   sending the analysis results to the host subsystem;
   scaling the unscaled image frames with a preview scaler to produce scaled preview frames at a third resolution that is less than the first resolution; and
   sending the scaled preview frames to the host, wherein sending the scaled preview frames to the host comprises sending each unscaled frame with a corresponding scaled preview frame to the host, wherein sending the unscaled image frames and corresponding preview frames to the host comprises sending the unscaled image frames and corresponding preview frames to the host upon detection of a partial shutter button press event.

9. A method for capturing images in an electronic device that has a host subsystem including storage and processing circuitry and that has a camera module coupled to the host subsystem, wherein the camera module comprises a camera sensor and has image processing and data formatting circuitry that receives data from the camera sensor and wherein the image processing and data formatting circuitry includes a multiframe scaler and includes frame buffer and multiframe image processor circuitry, the method comprising:
   receiving unscaled image frames at a first resolution with the multiframe scaler;
   scaling the unscaled image frames with the multiframe scaler to produce scaled image frames at a second resolution that is less than the first resolution;
   buffering the scaled image frames with the frame buffer and multiframe image processor circuitry;
   analyzing the scaled image frames with the frame buffer and multiframe image processor circuitry to produce analysis results;
   compressing the unscaled image frames with an image compression circuit in the image processing and data formatting circuit to produce compressed unscaled image frames;
   appending the analysis results to the compressed unscaled image frames; and
   sending the compressed unscaled image frames to the host subsystem from the camera module.

10. The method defined in claim 9 wherein the image processing and data formatting circuitry further comprises a preview scaler, the method further comprising:
    scaling the unscaled image frames to produce scaled preview frames at a third resolution that is less than the first resolution using the preview scaler.

11. The method defined in claim 10 wherein analyzing the scaled image frames comprises producing a quality factor representative of exposure quality for each respective scaled image frame in a group of scaled image frames in the frame buffer.

12. The method defined in claim 11 wherein appending the analysis results to the compressed unscaled image frames comprises appending the quality factor to each of the unscaled image frames.

13. The method defined in claim 12 further comprising:
    with the host subsystem, determining which of the compressed unscaled image frames to retain and which to discard based on the appended quality factors.

14. The method defined in claim 10 wherein analyzing the scaled image frames comprises producing a quality factor for each respective scaled image frame in a group of scaled image frames in the frame buffer and multiframe image processor circuitry and wherein appending the analysis results to the compressed unscaled image frames comprises appending the quality factor to each of the unscaled image frames.

* * * * *